Patented Mar. 1, 1938

2,109,495

UNITED STATES PATENT OFFICE 2,109,495

TREATMENT OF RUBBER AND RELATED HYDROCARBONS

Ernest M. Marks, Lansdowne, Pa., assignor to The Atlantic Refining Company, Philadelphia, Pa., a corporation of Pennsylvania No Drawing. Application November 8, 1934, Serial No. 752,185

8 Claims. (Cl. 260—1)

The present invention relates to the thermal treatment, in the presence of argillaceous materials, of rubber and substances of a similar nature, and relates more particularly to the thermal treatment of rubber substances in the presence of argillaceous materials and hydrogen or gases containing hydrogen.

An object of this invention is to effect hydrogenation and/or polymerization-hydrogenation of rubber and rubber-like compounds by treatment of such materials, at elevated temperature and pressure, with hydrogen-containing gas in the presence of argillaceous or clay-like catalysts.

A further object of this invention is the hydrogenation and/or polymerization-hydrogenation of rubber-like substances, for example, natural rubber or caoutchouc, balata and similar materials, as well as the related highly polymerized unsaturated compounds, e. g., the polymerization products of butadiene, isoprene, chloroprene, styrene, indene and the like, in the presence of a catalyst which is substantially unaffected by impurities usually contained in such hydrocarbons.

Heretofore, it has been proposed to effect hydrogenation of rubber or cyclo-rubber in the presence of metallic catalysts such as nickel, platinum and other heavy metals or heavy metal compounds, particularly those within the 8th group of the periodic system. Such method of hydrogenation could be carried on successfully only after the removal from the rubber of those natural impurities which poison the catalysts, i. e., nitrogen compounds, proteins, resins, etc. Such purification from these compounds is so expensive that the hydrogenated rubbers and more particularly hydrocyclo rubber, in spite of its desirable properties for certain purposes, have never come into extensive commercial use. By means of my invention I may completely avoid the costly step of purification.

In accordance with my invention, the hydrocarbons are subjected to treatment at temperatures of the order of from about 100° C. to about 350° C., in the presence of catalytic argillaceous materials such as fuller's earth, clay, activated clays, bentonite, kieselguhr, floradin and the like, and preferably in the presence of hydrogen or gases containing hydrogen. I have found that these catalysts are not poisoned by the natural impurities of the rubber which poison heavy metal catalysts and that therefore they may be applied to the treatment of rubber which has not been subjected to purification.

I have found that by subjecting materials such as rubber or rubber-like hydrocarbons to thermal treatment at temperatures of from about 100° C. to about 350° C., and preferably at temperatures of from about 200° C. to about 300° C., in the presence of an argillaceous catalyst such as clay, that such materials are polymerized or cyclocized to form higher molecular weight polymers, such as, for example, cyclo-rubber. I have further discovered that rubber or the rubber-like hydrocarbons, when subjected to thermal treatment at temperatures of the order of from about 100° C. to about 350° C., in the presence of an argillaceous catalyst and hydrogen, are converted into hydrocyclo-rubber and hydrogenated, polymerized products related thereto. Preferably, my process of hydrogenation and/or polymerization-hydrogenation is carried on under super-atmospheric pressure, for example, pressures of the order of from about 10 to about 200 atmospheres are suitable, and pressures of the order of from about 50 to about 100 atmospheres are particularly desirable or preferable. The quantity of catalyst employed in accordance with my invention may vary from about 5% to about 100% by weight of the hydrocarbon being treated, and in some instances may be more or less, depending upon the character of the catalyst and the material being treated. The time of reaction may be of the order of from about 15 minutes to about 6 hours, and may be somewhat longer in those instances in which the lower temperatures are employed. It is to be understood that the relationship between reaction time, temperature and pressure, as well as the ratio of hydrocarbon to catalyst and to hydrogen, is dependent upon the character of the material undergoing treatment and the character of the product desired. The degree of hydrogenation or polymerization-hydrogenation may be varied, depending upon the properties desired in the final product, i. e., the product may be partially or fully hydrogenated.

The following examples are illustrative of an aspect of my invention:

(1) Milled pale crepe rubber was dissolved in benzene to give a solution containing about 10% by weight of rubber and the rubber was precipitated from solution with methanol, in order to remove impurities such as nitrogenous materials, proteins and natural inhibitors. This step of purification was repeated a second and a third time, and the final precipitated rubber was again dissolved in benzene to give a solution containing about 9.0% by weight of rubber. To this solution was added an argillaceous catalyst, in this instance a quantity of fuller's earth of 200 mesh and finer, which had been dehydrated at about 900° F., the quantity of earth employed being about 25% by weight of the rubber contained in the benzene solution. The rubber was then precipitated from solution by adding alcohol, with stirring, so that a homogeneous mixture of precipitated rubber and catalyst was obtained. The bulk of solvents was removed by decantation and the rubber-catalyst mixture was heated at relatively low temperature under reduced pressure to remove traces of solvent therefrom. The mixture was hydrogenated in an auto-clave at a temperature of from about 225° C. to 230° C., for a period of approximately 3 hours; the initial hydrogen pressure was of the order of 60 atmospheres and the maximum pressure reached during the heating was about 96 atmospheres. The hydrogenated product, after removal of the catalyst therefrom, was found to be harder than the initial rubber, tough and gelatinous, soluble in benzene, chloroform and ether, but insoluble in alcohol and acetone, dispersable in hydrocarbon oil, resistant to oxidation, the product being about 87% saturated as determined by the Johansen iodine addition number. Furthermore, the product had a refractive index of 1.5216 at 20° C., and a specific gravity of 0.957 at 20° C., which, in conjunction with its saturation and its resistivity to oxidation, indicated the material to be hydro-cyclo-rubber.

(2) Milled pale crepe rubber was purified and impregnated with a clay catalyst in accordance with the method set forth in Example (1). In this instance, however, the quantity of catalyst employed was about 125% by weight of the rubber to be treated. The rubber-catalyst mixture was hydrogenated at a temperature of from about 225° C. to 230° C., for a period of approximately 3 hours; the initial hydrogen pressure was of the order of 51 atmospheres and the maximum pressure reached during the heating was about 88 atmospheres. The hydrogenated product, after removal of the catalyst therefrom, was found to be closely similar to the product of Example (1), soluble in benzene, chloroform and ether, but insoluble in alcohol and acetone, readily dispersable in hydrocarbon oils, and resistant to oxidation, the product being about 90% saturated.

(3) Milled pale crepe rubber was purified and impregnated with a fine clay catalyst in accordance with the method set forth in Example (1). The quantity of catalyst employed, as in Example (2), was about 125% by weight of the rubber to be treated. This mixture was then hydrogenated at a temperature of from about 275° C. to 280° C., for a period of approximately 5½ hours; the initial hydrogen pressure was of the order of 50 atmospheres and the maximum pressure reached during the heating was about 89 atmospheres. After hydrogenation, the product was dissolved in benzol, and the catalyst was removed by filtration. Upon removal of the solvent from the hydrogenated product, such product was found to be fairly hard and tough, and brittle when subjected to shock, soluble in benzene, chloroform and ether, but insoluble in alcohol and acetone, dispersable in hydrocarbon oils, and resistant to oxidation, the product being about 90% saturated.

(4) Milled pale crepe rubber, without purification, was dissolved in benzene and a quantity of clay catalyst equivalent to 125% of the weight of the rubber was added thereto. The benzene was removed from the mixture and a homogeneous mass of rubber and catalyst was obtained. This mass was subjected to hydrogenation at a temperature of from about 225° C. to 230° C., for a period of approximately 3 hours; the initial hydrogen pressure was of the order of 51 atmospheres and the maximum pressure reached during the heating was about 84 atmospheres. The hydrogenated product, after removal of the catalyst therefrom, was found to be closely similar to the products from Examples (1) and (2), soluble in aromatic solvents, chloroform and ether, but insoluble in alcohol and acetone, readily dispersable in hydrocarbon oil and resistant to oxidation, the product being about 90% saturated.

(5) Milled pale crepe rubber, without purification, was dissolved in benzene and a quantity of 200 mesh clay, equivalent to about 125% of the weight of the rubber, was added thereto, together with about 20% by weight of lubricating oil having a viscosity of 250″ Saybolt Universal at 100° F., and an A. P. I. gravity of 25°. The benzene was removed from the mixture and a homogeneous mass of rubber containing oil and catalyst was obtained. Hydrogenation of the mass, under the conditions set forth in Example (4), yielded a product which was soluble in benzene, chloroform and ether, dispersable in hydrocarbon oil and resistant to oxidation, the combined product being about 92.5% saturated.

It will be seen from the above examples, that hydrogenation and/or hydrogenation-polymerization of rubber, in the presence of an argillaceous catalyst, may be equally well accomplished regardless of the presence or absence in the rubber, of substances which poison the conventional hydrogenation catalysts and render them ineffective.

Rubber to be used in my process is preferably subjected to preliminary milling, which may be a normal milling such as is commonly applied to rubber or may be an excessive milling whereby the rubber is reduced to a soft, sticky consistency.

While I have described a particular method of incorporating the catalyst in the rubber or other rubber-like substances prior to thermal treatment, I do not intend to be limited thereby. For example, instead of precipitating the rubber from solvent solution in admixture with the catalyst, I may mill the catalyst directly into the rubber during the milling process and so avoid the use of solvents. Similarly, while I have described removal of the catalyst from the rubber after the treatment, I contemplate certain uses such as in paints where such removal will not be necessary but where the catalyst can be allowed to remain in the product as a filler.

My treatment may be carried on in the presence of solvent liquids in which rubber or the related hydrocarbons may be dispersed. For example, the hydrocarbons to be treated may be dissolved in a solvent such as petroleum naphtha or benzene, and the solution may then be subjected to hydrogenation in the presence of an argillaceous catalyst. Preferably, the solvents employed are saturated in character, so that neither hydrogen nor the catalyst will be diverted from the hydrogenation of the rubber or related hydrocarbons. Solvents such as cyclo-hexane, hydrogenated naphthalene and the like may be used to advantage in my process.

Materials such as crude or refined rubber may be hydrogenated or cyclocized and hydrogenated in accordance with my invention. Or, polymerized or cyclocized rubber and related hydrocarbons may be treated in the presence of my argillaceous catalysts and hydrogen or a hydrogen-containing gas. Rubber and the related hydrocarbons, when subjected to my thermal treatment in the presence of an argillaceous catalyst, but in the absence of hydrogen, may be polymerized or cyclocized without hydrogenation or saturation of the double bonds contained therein. However, rubber and like hydrocarbons, when treated in the presence of hydrogen are simultaneously polymerized or cyclocized and hydrogenated. Such products, obtained in accordance with my process, have a marked stability against oxidation and may be employed in the preparation or weather-resistant paints and varnishes, or in the production of lubricants of improved viscosity-temperature relationship which are stable to oxidation.

For brevity, in the appended claims, the term "argillaceous catalyst" is to be understood to comprehend a catalyst consisting of one or more substances such as fuller's earth, adsorptive clay, and burned clays such as are employed in the decolorization of oils, activated clay-like materials, bentonite, kieselguhr and the like. Likewise, the term "rubber-like substances" is to be understood to comprehend highly polymerized unsaturated substances such as natural rubber or caoutchouc, balata and similar materials, as well as the polymers of butadiene, isoprene, chloroprene, styrene, indene and the like.

What I claim is:

1. In a process for treating natural and synthetic rubbers, the steps which consist in heating rubber in the presence of an argillaceous catalyst and hydrogen and thereafter separating the treated rubber from said catalyst.

2. In a process for treating natural and synthetic rubbers, the steps which consist in heating said substances to a temperature above 100° C. in the presence of an argillaceous catalyst and hydrogen and thereafter separating the treated rubber from said catalyst.

3. In a process for treating natural and synthetic rubbers, the step which consists in heating rubber in the presence of an argillaceous catalyst and hydrogen under superatmospheric pressure.

4. In a process for treating natural and synthetic rubbers, the step which consists in heating rubber in the presence of an argillaceous catalyst and hydrogen under a pressure of from about 10 to about 200 atmospheres.

5. In a process for treating natural and synthetic rubbers, the step which consists in heating rubber to a temperature of from about 100° C. to about 350° C. in the presence of an argillaceous catalyst and hydrogen under a pressure of about 10 to about 200 atmospheres.

6. In a process for treating natural and synthetic rubbers, the step which consists in heating rubber, in solution in an organic solvent, in the presence of an argillaceous catalyst and hydrogen under superatmospheric pressure.

7. A process for treating natural and synthetic rubbers which consists in heating rubber to a temperature of from about 200° C. to about 350° C. in the presence of fuller's earth catalyst and hydrogen under a pressure of from about 10 to about 200 atmospheres and thereafter separating the treated rubber from the catalyst.

8. A rubber product produced substantially in accordance with the steps of process set forth in claim 1.

ERNEST M. MARKS.